United States Patent
Liu et al.

(10) Patent No.: US 10,582,500 B2
(45) Date of Patent: Mar. 3, 2020

(54) SUB-BAND SCHEDULING METHOD AND APPARATUS

(71) Applicant: HUAWEI TECHNOLOGIES CO., LTD., Shenzhen, Guangdong (CN)

(72) Inventors: Yalin Liu, Shenzhen (CN); Guangzhu Zeng, Hangzhou (CN); Lei Chen, Chengdu (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 20 days.

(21) Appl. No.: 15/928,069

(22) Filed: Mar. 21, 2018

(65) Prior Publication Data

US 2018/0213534 A1    Jul. 26, 2018

Related U.S. Application Data

(63) Continuation of application No. PCT/CN2016/100138, filed on Sep. 26, 2016.

(30) Foreign Application Priority Data

Sep. 24, 2015 (CN) .......................... 2015 1 0617843

(51) Int. Cl.
*H04W 72/04*  (2009.01)
*H04W 72/12*  (2009.01)

(52) U.S. Cl.
CPC ....... *H04W 72/0453* (2013.01); *H04W 72/12* (2013.01)

(58) Field of Classification Search
CPC ......... H04W 72/0453; H04W 72/1236; H04W 72/1278; H04W 74/0833; H04L 5/0044;
(Continued)

(56) References Cited

U.S. PATENT DOCUMENTS

| | | | |
|---|---|---|---|
| 2011/0034198 A1 | 2/2011 | Chen et al. | |
| 2011/0317777 A1* | 12/2011 | Huang | H04W 74/004 375/259 |

(Continued)

FOREIGN PATENT DOCUMENTS

| CN | 101212410 A | 7/2008 |
|---|---|---|
| CN | 101567714 A | 10/2009 |

(Continued)

OTHER PUBLICATIONS

R2-153548 ETRI, "Consideration on Random Access for Heterogeneous TTIs in a Carrier", 3GPP TSG-RAN WG2 Meeting #91,Beijing, China, Aug. 24-28, 2015,total 3 pages.

*Primary Examiner* — Michael Thier
*Assistant Examiner* — Brian P Cox
(74) *Attorney, Agent, or Firm* — Womble Bond Dickinson (US) LLP

(57) ABSTRACT

A sub-band scheduling method, including: sending, to a base station on a source sub-band, a first message that carries information about a data attribute requirement of to-be-transmitted data, where the information about the data attribute requirement includes at least one of the following: a transmission delay, a transmission delay type, a data bandwidth requirement, or a packet loss sensitivity; receiving, on the source sub-band, a second message that carries sub-band information of a target sub-band, where the target sub-band is a sub-band that is scheduled by the base station and that meets the data attribute requirement of the to-be-transmitted data, and the sub-band information includes at least one of the following: a sub-band number, a sub-band frequency channel number, a timing advance, an uplink resource allocated by the base station, a sub-band sending power level, or a bandwidth; and transmitting data on the target sub-band according to the sub-band information.

18 Claims, 10 Drawing Sheets

(a)

(b)

(58) Field of Classification Search
CPC ..... H04L 5/0053; H04L 5/0064; H04L 5/008; H04L 5/0094; H04L 5/0007; H04L 27/2602; H04L 27/2655
See application file for complete search history.

(56) References Cited

U.S. PATENT DOCUMENTS

| | | | |
|---|---|---|---|
| 2012/0140670 A1 | 6/2012 | Shimobayashi et al. | |
| 2012/0276943 A1 | 11/2012 | Adachi | |
| 2012/0287865 A1* | 11/2012 | Wu | H04W 74/006 370/329 |
| 2012/0320845 A1 | 12/2012 | Choi et al. | |
| 2013/0083753 A1* | 4/2013 | Lee | H04W 72/0453 370/329 |
| 2014/0071954 A1 | 3/2014 | Au et al. | |
| 2015/0264718 A1* | 9/2015 | Yu | H04W 72/02 370/329 |
| 2015/0280871 A1* | 10/2015 | Xu | H04W 72/0446 370/330 |
| 2017/0290008 A1* | 10/2017 | Tooher | H04L 1/0007 |

FOREIGN PATENT DOCUMENTS

| | | |
|---|---|---|
| CN | 102484553 A | 5/2012 |
| JP | 2012-231322 A | 11/2012 |
| KR | 20110088382 A | 8/2011 |
| WO | 2008097023 A1 | 8/2008 |
| WO | 2010110522 A1 | 9/2010 |
| WO | 2016171767 A1 | 10/2016 |

* cited by examiner

SUB-BAND SCHEDULING METHOD AND APPARATUS

CROSS-REFERENCE TO RELATED APPLICATIONS

This application is a continuation of International Application No. PCT/CN2016/100138, filed on Sep. 26, 2016, which claims priority to Chinese Patent Application No. 201510617843.0, filed on Sep. 24, 2015. The disclosures of the aforementioned applications are hereby incorporated by reference in their entireties.

TECHNICAL FIELD

The present disclosure relates to the field of communications technologies, and specifically, to a sub-band scheduling method and apparatus.

BACKGROUND

In conventional cellular communications, if a terminal wants to access a cellular network, the terminal needs to complete a random access process. The random access process mainly includes interaction between a terminal and a base station, to implement synchronization with the base station. In addition, the base station allocates resources to users. In Long Term Evolution (LTE for short), a terminal is notified of a random access resource by using a system message or mobile control information. Different systems may use different random access resource configurations. Specifically, a system may configure a frequency domain location of a random access resource and a frame or a subframe in which a random access resource is configured.

Contention-based random access and non-contention based random access are supported in LTE. The contention-based random access means that multiple terminals use a same preamble and perform random access on a same time-frequency resource. The non-contention based random access means that the system specifies dedicated preambles for terminals, and when the terminals access the system, collision does not occur. In an LTE system, the contention-based random access is generally completed by using four steps. FIG. 1 is a contention-based random access process, as shown in FIG. 1.

Step 1: A user terminal randomly selects a preamble, and sends the preamble to a base station on a random access channel (RACH for short) by using a message 1.

Step 2: The base station detects the preamble, and sends a random access response (a message 2) to the user terminal, where the random access response includes the following information: location indication information of an uplink resource allocated to the user terminal, and a temporarily-allocated cell radio network temporary identifier (C-RNTI for short).

Step 3: After receiving the random access response, the user terminal sends an uplink message (a message 3) on the allocated uplink resource according to indication of the preamble.

Steps 4: The base station receives the uplink message of the user terminal and returns a contention resolution message (a message 4) to a user terminal that successfully performs accessing.

In the LTE, a group of 64 preambles in total are defined, and a preamble is a group of zero correlation code. Preambles for contention are categorized into two groups: a group A and a group B, and a quantity of preambles in the group A is determined by a parameter preamblesGroupA. If the quantity of preambles in the group A is equal to a total quantity of preambles for contention, it means that the group B does not exist, and a preamble is selected from the group A. A preamble requires relatively low synchronization precision. The base station estimates a timing advance (TA for short) of the user terminal according to the received preamble, so as to adjust uplink transmission timing of the user terminal.

If the base station can correctly demodulate the preamble, the base station sends the random access response to the user terminal. The random access response message includes the TA and an uplink grant (UL Grant) resource, and the UL grant resource is an uplink transmission resource of a corresponding size determined according to the sent preamble. The user terminal transmits the message 3 by using the UL grant resource.

US20140071954A1 discloses a method for adaptive transmission time intervals (TTI for short), and is mainly to adapt to various different service requirements in the future. For example, some services have a relatively low transmission delay, and some services have a relatively high transmission delay. Therefore, US20140071954A1 defines a frame structure that can adapt to different services, and multiple different TTIs can be supported at the same time to adapt to different services in the future.

In a frame structure disclosed in US20140071954A1, one band is divided into multiple sub-bands or carriers, and a frame structure of a TTI of a length is transmitted on each sub-band. The sub-bands are multiple small bands that are obtained by dividing a large band, and there is no band leakage guard band between the bands, or only an OFDM symbol is used to eliminate interference between the bands. In a broad sense, a sub-band may be an independent small band or carrier. Generally, information about a TTI supported in a system is notified to a terminal by using a system broadcast message. Generally, a notification message is sent only on a sub-band. Therefore, there is a sub-band used for sending a downlink broadcast message. The sub-band in US20140071954A1 is referred to as a common sub-band, and is mainly used to send the downlink broadcast message, for example, an MIB or SIB. Similarly, to save random access resources, random access resources are not defined on each sub-band. For example, random access resources may be defined on the common sub-band.

An existing LTE random access process is completed on one carrier (a random access process is also completed on one carrier in a carrier aggregation scenario), and a process is shown in FIG. 1. After the message 3 is transmitted, the base station sends a contention resolution message. After contention is completed, the random access process is also completed, and immediately, a data transmission process is entered.

In LTE, only a single frame structure is supported, a same TTI is used, and a TTI of 10 ms is currently defined. A length of a TTI may be 1 ms in the future, and the prior art cannot satisfy a scheduling requirement of a 1 ms delay in the future. In addition, if multiple TTIs are supported in the future, the prior art cannot satisfy a scheduling requirement of multiple TTIs in the future.

SUMMARY

Embodiments of the present disclosure provide a sub-band scheduling method and apparatus, so that a target sub-band that is suitable for transmitting current data or a current service may be randomly accessed quickly, so as to implement a quick data or service transmission process on the target sub-band.

According to a first aspect, an embodiment of the present disclosure provides a sub-band scheduling method, where the method is used in a random access process and includes: sending, to a base station on a source sub-band, a first message that carries information about a data attribute requirement of to-be-transmitted data, where the information about the data attribute requirement includes at least one of the following: a transmission delay, a transmission delay type, a data bandwidth requirement, or a packet loss sensitivity;

receiving, from the base station on the source sub-band, a second message that carries sub-band information of a target sub-band, where the target sub-band is a sub-band that is scheduled by the base station and that meets the data attribute requirement of the to-be-transmitted data, and the sub-band information includes at least one of the following: a sub-band number, a sub-band frequency channel number, a timing advance, an uplink resource allocated by the base station, a sub-band sending power level, or a bandwidth; and transmitting data on the target sub-band according to the sub-band information of the target sub-band.

With reference to the first aspect, in a first possible implementation of the first aspect, the first message is a non-transport layer message, and the second message is a contention resolution message.

With reference to the first possible implementation of the first aspect, in a second possible implementation of the first aspect, after the receiving a second message, the method further includes: performing sub-band synchronization on the target sub-band.

With reference to the first aspect, in a third possible implementation of the first aspect, the first message is a message used to carry a random access preamble, and the second message is a random access response message.

With reference to the third possible implementation of the first aspect, in a fourth possible implementation of the first aspect, after the receiving a second message, the method further includes: performing sub-band synchronization on the target sub-band.

With reference to the third or the fourth possible implementation of the first aspect, in a fifth possible implementation of the first aspect, the random access preamble in the message used to carry a random access preamble carries signature information, and different signatures are corresponding to different data attributes.

With reference to the first to the fifth possible implementations of the first aspect, in a sixth possible implementation of the first aspect, the uplink resource is a time-frequency resource allocated on the target sub-band.

With reference to the sixth possible implementation of the first aspect, in a seventh possible implementation of the first aspect, the time-frequency resource includes a time domain subframe number and a frequency domain resource block; and the time domain subframe number is determined according to a subframe number of a subframe in which the second message is located, or is indicated by the base station by using a random access message; and the random access message includes at least one of a message 1, a message 2, a message 3, or a message 4 in embodiments.

With reference to the seventh possible implementation of the first aspect, in an eighth possible implementation of the first aspect, that the time domain subframe number is determined according to a subframe number of a subframe in which the second message is located includes:

when $\Delta T+\delta > T_p$, a subframe number of a subframe that is on the target sub-band and that is closest to a current moment is the time domain subframe number; or when $\Delta T+\delta \leq T_p$, a subframe number of a next subframe of a subframe that is on the target sub-band and that is closest to a current moment is the time domain subframe number, where $\Delta T$ is a time difference between the current moment and a start moment of the subframe that is on the target sub-band and that is closest to the current moment, $\delta$ is a timing advance, and $T_p$ is a scheduling processing time of the target sub-band.

With reference to the first to the eighth possible implementations of the first aspect, in a ninth possible implementation of the first aspect, the source sub-band and the target sub-band are corresponding to different transmission time intervals TTIs.

With reference to the first to the ninth possible implementations of the first aspect, in a tenth possible implementation of the first aspect, the method further includes:

sending, on another sub-band other than the target sub-band, a scheduling request SR by using a physical uplink control channel PUCCH of the target sub-band; or sending, on another sub-band other than the target sub-band, an SR by adding the SR to the data sent on the target sub-band.

According to a second aspect, an embodiment of the present disclosure provides a sub-band scheduling method, where the method is used in a random access process and includes: receiving, from a user terminal on a source sub-band, a first message that carries information about a data attribute requirement of to-be-transmitted data, where the information about the data attribute requirement includes at least one of the following: a transmission delay, a transmission delay type, a data bandwidth requirement, or a packet loss sensitivity;

sending, to the user terminal on the source sub-band, a second message that carries sub-band information of a target sub-band, where the target sub-band is a sub-band that is scheduled for the user terminal and that meets the data attribute requirement of the to-be-transmitted data, and the sub-band information includes at least one of the following: a sub-band number, a sub-band frequency channel number, a timing advance, an uplink resource allocated to the user terminal, a sub-band sending power level, or a bandwidth; and transmitting data on the target sub-band according to the sub-band information of the target sub-band.

With reference to the second aspect, in a first possible implementation of the second aspect, the first message is a non-transport layer message, and the second message is a contention resolution message.

With reference to the first possible implementation of the second aspect, in a second possible implementation of the second aspect, after the sending a second message, the method further includes: performing sub-band synchronization on the target sub-band.

With reference to the second aspect, in a third possible implementation of the second aspect, the first message is a message used to carry a random access preamble, and the second message is a random access response message.

With reference to the third possible implementation of the second aspect, in a fourth possible implementation of the second aspect, after the sending a second message, the method further includes: performing sub-band synchronization on the target sub-band.

With reference to the third or the fourth possible implementation of the second aspect, in a fifth possible implementation of the second aspect, the random access preamble in the message used to carry a random access preamble carries signature information, and different signatures are corresponding to different data attributes.

With reference to the first to the fifth possible implementations of the second aspect, in a sixth possible implementation of the second aspect, the uplink resource is a time-frequency resource allocated on the target sub-band.

With reference to the sixth possible implementation of the second aspect, in a seventh possible implementation of the second aspect, the time-frequency resource includes a time domain subframe number and a frequency domain resource block; and the time domain subframe number is determined according to a subframe number of a subframe in which the second message is located, or is indicated by using a random access message; and the random access message includes at least one of a message 1, a message 2, a message 3, or a message 4 in embodiments.

With reference to the seventh possible implementation of the second aspect, in an eighth possible implementation of the second aspect, that the time domain subframe number is determined according to a subframe number of a subframe in which the second message is located includes:

when $\Delta T+\delta > T_p$, a subframe number of a subframe that is on the target sub-band and that is closest to a current moment is the time domain subframe number; or when $\Delta T+\delta \leq T_p$, a subframe number of a next subframe of a subframe that is on the target sub-band and that is closest to a current moment is the time domain subframe number, where $\Delta T$ is a time difference between the current moment and a start moment of the subframe that is on the target sub-band and that is closest to the current moment, $\delta$ is a timing advance, and $T_p$ is a scheduling processing time of the target sub-band.

With reference to the first to the eighth possible implementations of the second aspect, in a ninth possible implementation of the second aspect, the source sub-band and the target sub-band are corresponding to different transmission time intervals TTIs.

With reference to the first to the ninth possible implementations of the second aspect, in a tenth possible implementation of the second aspect, the method further includes:

receiving, on another sub-band other than the target sub-band, a scheduling request SR by using a physical uplink control channel PUCCH of the target sub-band; or receiving, on another sub-band other than the target sub-band, an SR by adding the SR to the data received on the target sub-band.

According to a third aspect, an embodiment of the present disclosure provides a sub-band scheduling apparatus, where the apparatus is used in a random access process and includes:

a sending module, configured to send, to a base station on a source sub-band, a first message that carries information about a data attribute requirement of to-be-transmitted data, where the information about the data attribute requirement includes at least one of the following: a transmission delay, a transmission delay type, a data bandwidth requirement, or a packet loss sensitivity;

a receiving module, configured to receive, from the base station on the source sub-band, a second message that carries sub-band information of a target sub-band, where the target sub-band is a sub-band that is scheduled by the base station and that meets the data attribute requirement of the to-be-transmitted data, and the sub-band information includes at least one of the following: a sub-band number, a sub-band frequency channel number, a timing advance, an uplink resource allocated by the base station, a sub-band sending power level, or a bandwidth; and a processing module, configured to transmit data on the target sub-band according to the sub-band information of the target sub-band.

According to a fourth aspect, an embodiment of the present disclosure provides a sub-band scheduling apparatus, where the apparatus is used in a random access process and includes:

a receiving module, configured to receive, from a user terminal on a source sub-band, a first message that carries information about a data attribute requirement of to-be-transmitted data, where the information about the data attribute requirement includes at least one of the following: a transmission delay, a transmission delay type, a data bandwidth requirement, or a packet loss sensitivity;

a sending module, configured to send, to the user terminal on the source sub-band, a second message that carries sub-band information of a target sub-band, where the target sub-band is a sub-band that is scheduled for the user terminal and that meets the data attribute requirement of the to-be-transmitted data, and the sub-band information includes at least one of the following: a sub-band number, a sub-band frequency channel number, a timing advance, an uplink resource allocated to the user terminal, a sub-band sending power level, or a bandwidth; and a processing module, configured to transmit data on the target sub-band according to the sub-band information of the target sub-band.

The embodiments of the present disclosure provide the sub-band scheduling method. The information about the data attribute requirement of the to-be-transmitted data is sent to the base station, and the base station feeds back, according to the information about the data attribute requirement, the corresponding sub-band information. The user terminal may perform scheduling from the source sub-band to the target sub-band according to the indication of the sub-band information, where a sub-band characteristic of the target sub-band may meet the data attribute requirement of the to-be-transmitted data. Further, a TTI corresponding to the target sub-band matches a data attribute of the to-be-transmitted data. According to the embodiments provided in the present disclosure, a target sub-band that is suitable for transmitting current data or a current service may be quickly accessed, so as to implement a quick data or service transmission process on the target sub-band.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

In the embodiments of the present disclosure, a user terminal, also referred to as user equipment (UE for short), a mobile terminal, mobile user equipment, or the like, may communicate with one or more core networks through a radio access network (RAN for short). The user equipment may be a mobile terminal, such as a mobile phone (also referred to as a "cellular" phone) and a computer with a mobile terminal. For example, the user terminal may be a portable, pocket-sized, handheld, computer built-in, or in-vehicle mobile apparatus, which exchanges voice and/or data with the radio access network.

A base station (BS for short) may be a base transceiver station in the GSM or CDMA, or may be a NodeB in the WCDMA, or may be an evolved NodeB (eNB or e-NodeB for short) in the LTE, or a base station in an evolved public land mobile network (PLMN for short) communications system (a "5G network" or a "5G system" for short) in the future. This is not limited in the present disclosure.

Figure 1:
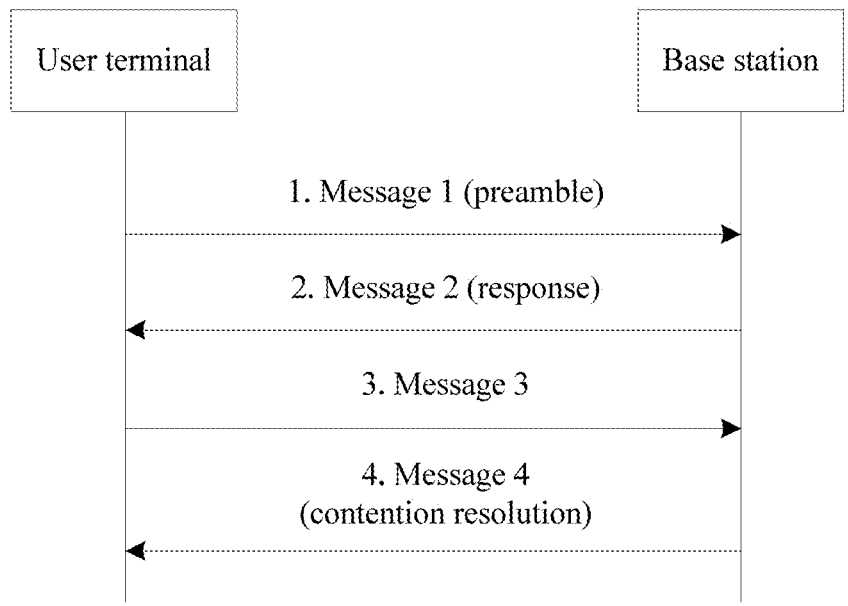
FIG. 1 is a contention-based random access process.
Figure 2:
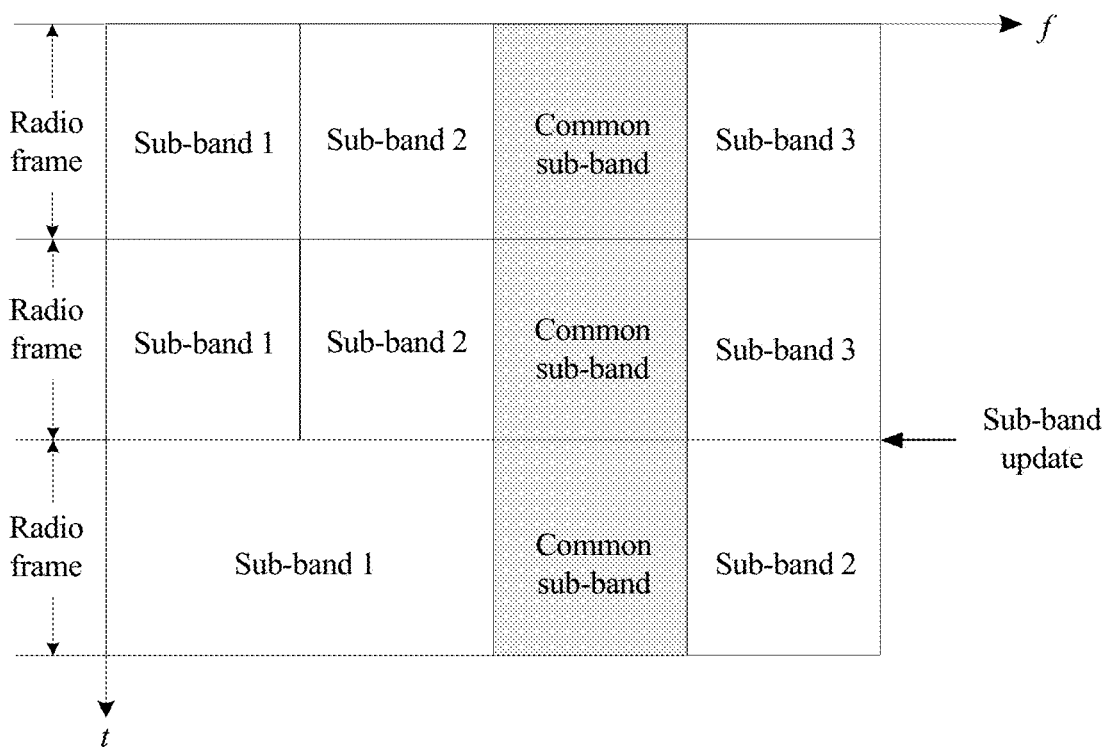
FIG. 2 is a schematic diagram of sub-band division.

In a future communications system, a band or a carrier may be divided into multiple sub-bands, and a quantity of sub-bands and a bandwidth of each sub-band are not limited. As shown in FIG. 2, FIG. 2 is a schematic diagram of sub-band division.

In a frequency domain, a band or a carrier of a specific bandwidth may be divided into several sub-bands, for example, four sub-bands in FIG. 2. Channels occupied by a sub-band 1, a sub-band 2, and a sub-band 3 are traffic channels (or data channels) (in FIG. 2, other parts other than a part marked in gray may be considered as traffic channels or data channels). After completing accessing, a user needs to transmit data on these sub-bands. One sub-band is corresponding to one TTI. All these sub-bands may be corresponding to different TTIs, or some of these sub-bands may be corresponding to a same TTI. Frame structures of frames transmitted on these sub-bands should be able to support different TTIs, that is, a frame structure of a frame transmitted on each sub-band should be able to support a TTI corresponding to the sub-band. A channel occupied by a common sub-band (a part marked in gray in FIG. 2) is a common channel, and may be further considered as a common control channel or a random access control channel. Random access is initiated mainly on the common sub-band. Sub-band division in duration of one radio frame does not change, but sub-band division in duration of multiple radio frames may change. For example, in FIG. 2, when a sub-band is updated, a sub-band 1 and a sub-band 2 in a current radio frame are combined into a sub-band 1 in a next radio frame. Certainly, sub-band division may remain unchanged or partial sub-band division changes.

Each sub-band may be corresponding to a different TTI length, and different TTI lengths match different types of service requirements or data transmission requirements. Therefore, a sub-band used for transmission needs to be selected according to a service requirement or a data transmission requirement. The embodiments of the present disclosure provide a sub-band scheduling method, a user terminal may perform scheduling from a common sub-band to a target sub-band in a random access process (generally, the target sub-band is corresponding to a particular TTI or the target sub-band is corresponding to a TTI that meets the service requirement or the data transmission requirement). Further, in a sub-band scheduling process, random access on the target sub-band may be implemented, so as to implement quick data transmission on the target sub-band.

In addition, the sub-band scheduling method provided in the embodiments of the present disclosure may be used in a scenario of cross-carrier and multiple different TTIs.

When the user terminal is to access a network or perform random access, the user terminal selects a sub-band or a common sub-band for initiating access to the base station. Then, the base station schedules or allocates an appropriate sub-band for the user terminal according to information about a data attribute requirement of data that is to be transmitted by the user terminal or information about a service attribute of a to-be-transmitted service. For ease of description, the sub-band or the common sub-band selected by the user terminal is referred to as a "source sub-band", and the sub-band scheduled or allocated by the base station for the user terminal is referred to as a target sub-band in the following. Specifically, the sub-band scheduling method provided in the embodiments of the present disclosure includes:

sending, by the user terminal to the base station on the source sub-band, a first message that carries information about a data attribute requirement of to-be-transmitted data, where the information about the data attribute requirement includes at least one of the following: a transmission delay, a transmission delay type, a data bandwidth requirement, or a packet loss sensitivity;

receiving, by the user terminal from the base station on the source sub-band, a second message that carries sub-band information of the target sub-band, where the target sub-band is a sub-band that is scheduled by the base station and that meets the data attribute requirement of the to-be-transmitted data, and the sub-band information includes at least one of the following: a bandwidth, a timing advance, or an uplink resource allocated by the base station; and transmitting data on the target sub-band according to the sub-band information of the target sub-band.

Optionally, the "source sub-band" is a sub-band for signaling interworking before sub-band scheduling is completed or a sub-band on which access is initiated, and is for distinguishing from the target sub-band. The source sub-band may be a common sub-band or even be any sub-band other than the target sub-band. The target sub-band is a sub-band for signaling interworking after the sub-band scheduling is completed. Further, the base station schedules or allocates, for the user equipment according to the information that is about the data attribute requirement of the to-be-transmitted data and that is sent by the user equipment, the target sub-band that meets the data attribute requirement, so that the user equipment transmits data or communicates on the target sub-band. It should be noted that in some special cases, the source sub-band and the target sub-band may be a same sub-band. When the target sub-band and the source sub-band are a same sub-band, sub-band scheduling or new target sub-band reallocating does not need to be performed, and communication is directly performed on the source sub-band. Further, in this case, the source sub-band should also meet the data attribute requirement of the to-be-transmitted data.

Optionally, the sub-band scheduling method provided in the embodiments of the present disclosure is used in a random access process.

Optionally, the source sub-band and the target sub-band are corresponding to different TTIs. Particularly, when the source sub-band and the target sub-band are a same sub-band, the source sub-band and the target sub-band are corresponding to a same TTI.

Specifically, the transmitting data on the target sub-band according to the sub-band information of the target sub-band may include: after receiving the sub-band information of the target sub-band that is sent by the base station, the user terminal may preform scheduling from the source sub-band to the target sub-band according to the sub-band information of the target sub-band. For example, the user terminal adjusts time synchronization according to the timing advance in the sub-band information, and transmits data on the uplink resource indicated by the sub-band information.

According to the sub-band scheduling method provided in the embodiments of the present disclosure, a target sub-band that is suitable for transmitting current data or a current service may be randomly accessed quickly, so as to implement a quick data or service transmission process on the target sub-band.

In an LTE system, contention-based random access is generally completed by using four messages: A first message (a message 1) carries a preamble used for random access, and a function of the preamble is to prevent conflict and collision. A base station detects a timing advance of a user terminal by using the preamble, and distinguishes between different user terminals by using the preamble. A second message (a message 2) is a random access response message and is used to notify the user terminal that the base station detects the preamble sent by the user terminal. The timing advance of the user terminal is adjusted, so that a time at which data subsequently transmitted by the user terminal arrives at the base station meets a detection requirement of the base station. It should be noted that, that the user terminal receives the message 2 does not indicate that the user terminal has accessed the base station. A third message (a message 3) is used for transmitting a non-access stratum message by the user terminal to the base station, and is a message submitted by a higher layer to a MAC layer. After receiving the third message, the base station returns a contention resolution message (a message 4) to the user terminal, and the user terminal determines, by using the message 4, whether contention for random access of the user terminal succeeds. Further, it may be considered that the message 1 is a message used to carry the random access preamble, the message 2 is the random access response message, the message 3 is the non-access stratum message, and the message 4 is the contention resolution message. For ease of description, the message 1, the message 2, the message 3, and the message 4 are directly used in the following embodiments.

Further, in the foregoing embodiment, the first message may be the message 3 in the random access process, and the second message may be the message 4 in the random access process. Alternatively, the first message is the message 1 in the random access process, and the second message is the message 2 in the random access process. The following embodiments provide detailed description or other details for the sub-band scheduling method, and details are as follows:

Embodiment 1

When a user terminal performs random access, in a start stage, a base station cannot obtain service information of the user terminal, and cannot determine which TTI used by the user terminal for service transmission is optimal. Therefore, a corresponding TTI sub-band can be selected only after the user terminal notifies the base station of a data attribute or a service type. In a conventional random access process, the user terminal generally adds a non-access stratum (NAS for short) message to a third message for random access, that is, a message 3, and the base station does not parse content of the non-access stratum message. However, if the base station needs to schedule a sub-band for data transmission according to the data attribute or the service type, the base station needs to learn of information about a data attribute requirement of data that is to be transmitted by the user terminal or a service type of a to-be-transmitted service. By enhancing or improving the conventional random access process, the sub-band scheduling method provided in Embodiment 1 of the present disclosure can adapt to a scenario in which a frame structure in a future communications system supports multiple TTIs.

Figure 3:
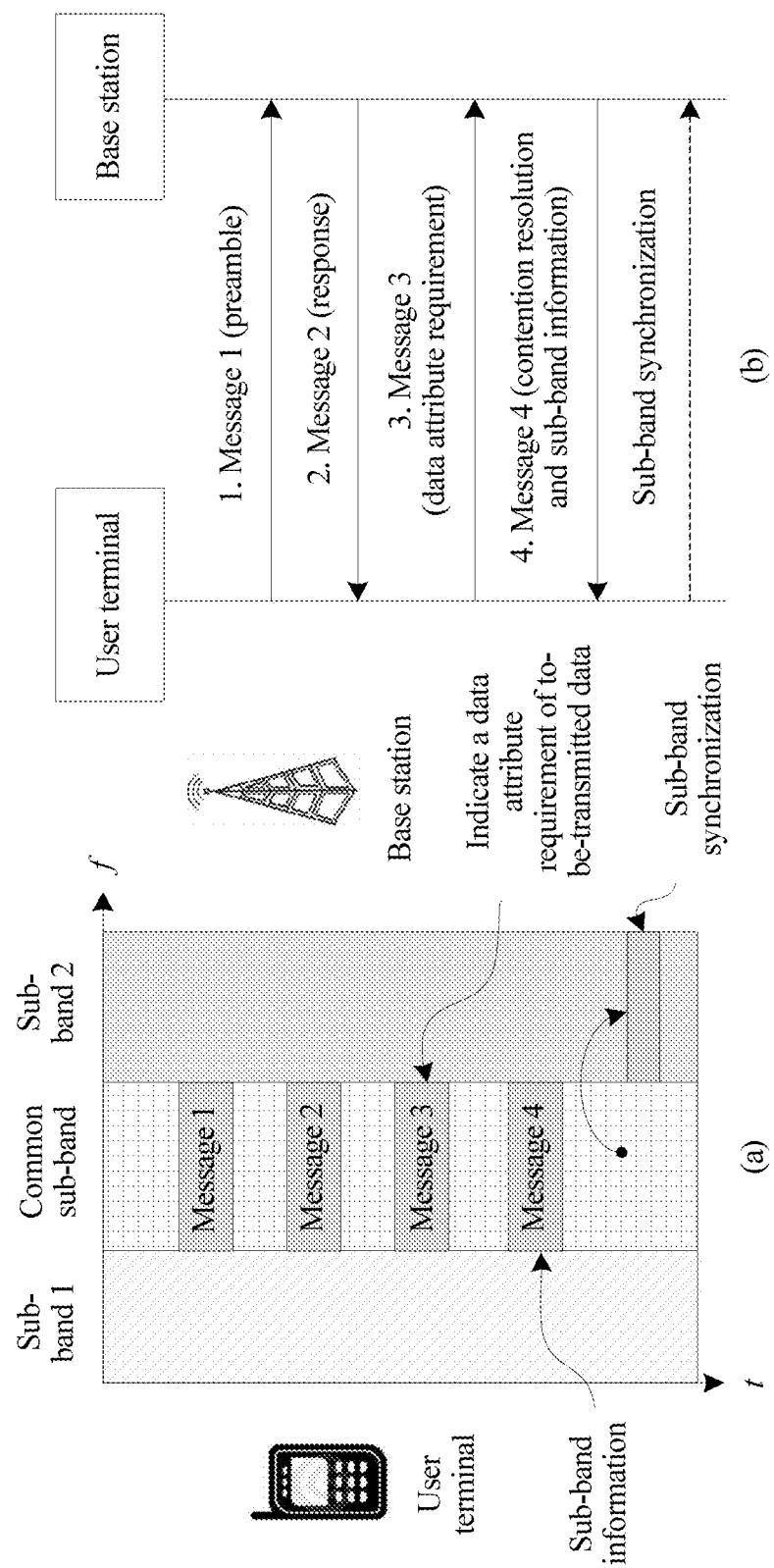
FIG. 3 shows a sub-band scheduling method according to Embodiment 1 of the present disclosure.

FIG. 3 shows the sub-band scheduling method according to Embodiment 1 of the present disclosure. In a system that supports a multi-TTI frame structure or in a future communications system, a sub-band scheduling process is shown in FIG. 3.

In contention-based random access, a message 1 and a message 2 shown in FIG. 3 have same functions as a message 1 and a message 2 in the conventional random access process (a specific structure may be different). For a message 3, a difference from the conventional random access process is that information about a data attribute requirement is carried in the message 3. The information about the data attribute requirement includes at least one of the following: a transmission delay, a transmission delay type, a data bandwidth requirement, or a packet loss sensitivity. Further, the message 3 may further include a sub-band sending power level.

After receiving the message 3, the base station selects an appropriate target sub-band for the user terminal according to the information about the data attribute requirement and resource information of all sub-bands, and sends sub-band information of the target sub-band to the user terminal by using a message 4. The target sub-band is a sub-band that meets the data attribute requirement. Specifically, the message 4 carries the sub-band information of the target sub-band, and the sub-band information may specifically include at least one of the following: a sub-band number, a sub-band frequency channel number, timing advance or timing advance (TA for short) information, an uplink resource allocated by the base station, a sub-band sending power level, a bandwidth, or the like. Certainly, the message 4 may also include conventional UL grant resource information. The sub-band information may be carried in a Media Access Control (MAC for short) layer control element (CE for short), and a UL grant resource is a resource on the target sub-band.

After receiving the message 4, the user terminal obtains the sub-band information (for example, the TA information and the UL grant resource information), performs synchronization (that is, sub-band synchronization) on a sub-band (that is, the target sub-band) indicated by the sub-band information, and performs first uplink transmission on the UL grant resource. Further, uplink synchronization (sub-band synchronization) on the sub-band indicated by the sub-band information herein is different from conventional synchronization. In the conventional synchronization, timing synchronization needs to be performed by using a synchronization sequence. In the sub-band synchronization herein, different sub-bands are corresponding to different TTIs, and therefore subframe boundaries of the sub-bands may be not aligned. When a user needs to perform transmission on a specified sub-band, subframe boundary alignment, that is, the uplink synchronization, needs to be first completed on a specified target sub-band. Start locations of all sub-bands on a radio frame are aligned, that is, the user terminal implements frame synchronization. Therefore, during sub-band synchronization, subframe alignment may be implemented by adjusting a TA (for details, refer to Embodiment 3), and a synchronization signal is not required to implement synchronization. Therefore, the sub-band synchronization herein is different from general synchronization. It should be noted that the target sub-band in the sub-band scheduling process may be a common sub-band.

Figure 4:
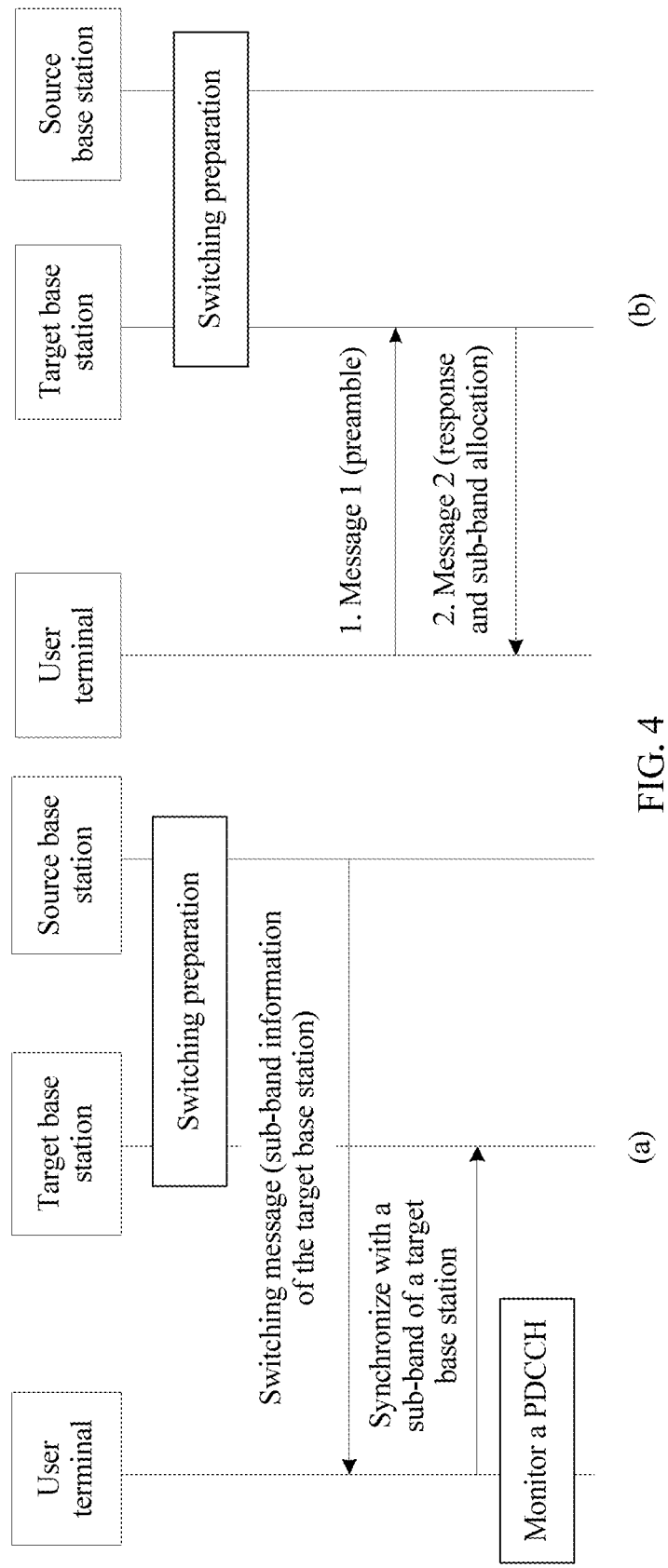
FIG. 4 shows another sub-band scheduling method according to Embodiment 1 of the present disclosure.

FIG. 4 shows another sub-band scheduling method according to Embodiment 1 of the present disclosure. As shown in FIG. 4, in non-contention based random access, if the sub-band information of the target sub-band is sent to the user terminal, there may be two solutions: One solution is that the sub-band information of the target sub-band is sent to the user terminal by using a switching message (as shown in FIG. 4(a)). The other solution is that the sub-band information of the target sub-band is carried in the message 2 (as shown in FIG. 4(b)). It should be understood that the message 2 may further carry sub-band information of another sub-band.

A non-contention based sub-band scheduling process includes: providing, by a source base station, sub-band information (specifically, the sub-band information may include at least one of the following: a sub-band number, sub-band TTI information, or a frequency domain resource location, and may further include an earliest scheduled resource and a resource allocated to a physical uplink control channel (PUCCH for short)) of a target base station for the user terminal by using a switching message, and sending, by the source base station, the sub-band information to the user terminal by using an air-interface switching message. After receiving the sub-band information, the user terminal directly performs synchronization on a sub-band (that is, a sub-band indicated in the switching message) corresponding to the target base station. After the synchronization is completed, a physical downlink control channel (PDCCH for short) may be monitored to obtain scheduling resource information or an uplink resource is requested by using an indicated PUCCH resource.

If the switching message does not carry the sub-band information of the target base station, but includes a dedicated preamble, the user terminal may perform random access on the target base station by using the specified preamble. After receiving the preamble, the target base station sends information about a scheduled sub-band and TA information to the user terminal by adding the information about a scheduled sub-band and the TA information to the message 2.

Embodiment 2

If a base station can learn a service transmission requirement (or a data transmission requirement) of a user terminal in advance, the base station can complete sub-band scheduling on a target sub-band. To complete the sub-band scheduling on the target sub-band, the user terminal needs to notify, in advance, the base station of information about a data attribute requirement (for example, a TTI requirement) of data that is to be transmitted by the user terminal. The user terminal transmits only a message 1 before a message 3. Therefore, the message 1 is the only message that may carry the information about the data attribute requirement. If the message 1 carries the information about the data attribute requirement, the base station may adjust a TA of the user terminal by using a message 2, and allocate a UL grant resource for the user terminal. The UL grant resource is a resource used for service scheduling on the target sub-band.

Figure 5:
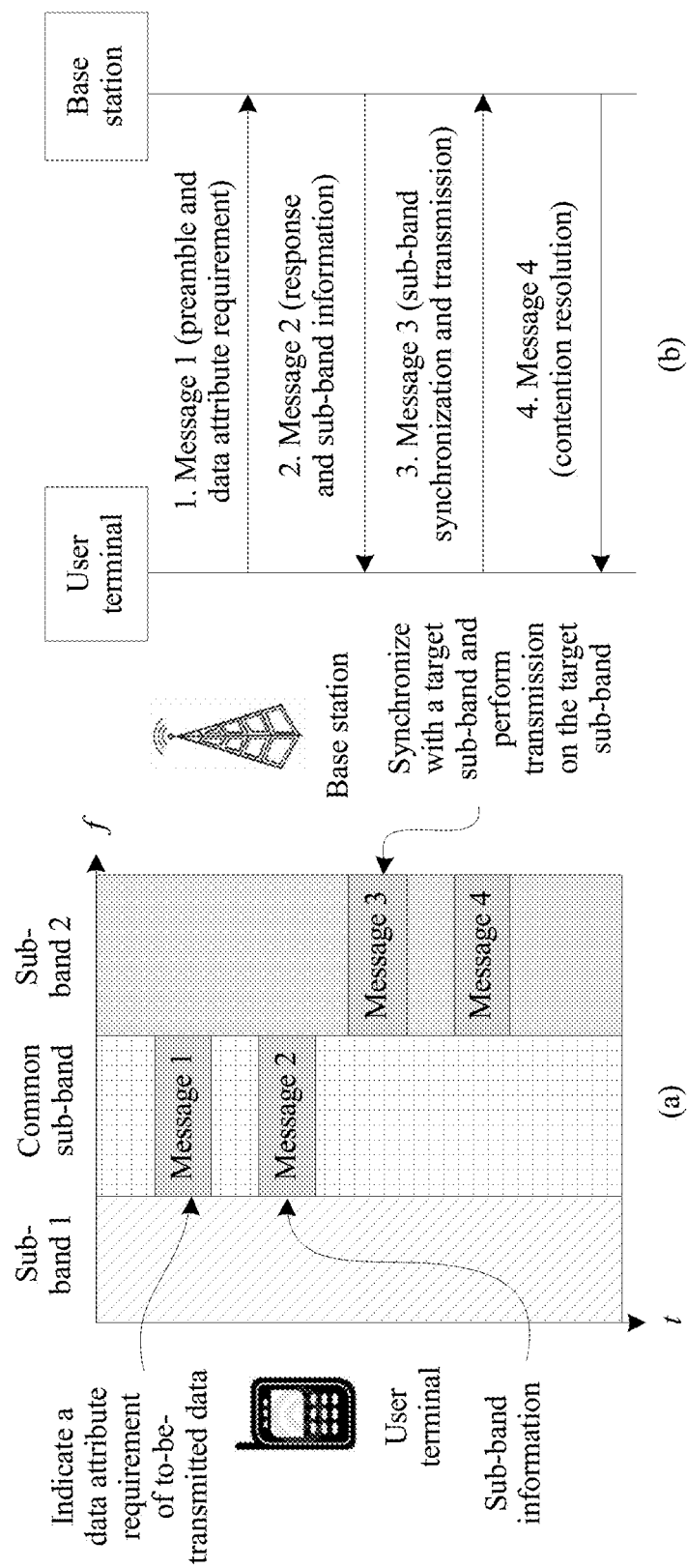
FIG. 5 shows a sub-band scheduling method according to Embodiment 2 of the present disclosure.

FIG. 5 shows a sub-band scheduling method according to Embodiment 2 of the present disclosure. As shown in FIG. 5(a), the message 1 and the message 2 are transmitted on a source sub-band (for example, a common sub-band in FIG. 5(a)), and the message 3 and a message 4 are transmitted on a scheduled target sub-band (for example, a sub-band 2 in FIG. 5(a)). To implement sub-band scheduling, data attribute information needs to be carried in the message 1. Specifically, signature information may be carried by using a preamble. Each signature represents one type of data attribute, so that the message 1 carries the information about the data attribute requirement. Description is provided by using an example in which a data attribute requirement is a TTI requirement. It may be expected that a quantity of different TTIs supported in a future communications system may be not random, and several TTIs that need to be supported in a system are generally defined. Currently, subcarrier intervals (different subcarrier intervals are corresponding to different TTIs) are 3.75 KHz (Ts=226.7 μs), 7.5 KHz (Ts=133.3 μs), 15 KHz (Ts=66.7 μs), 30 KHz (Ts=33.3 μs), 60 KHz (Ts=16.7 μs) and the like. These subcarrier intervals can basically meet a service requirement. Certainly, the subcarrier intervals may be expanded according to a requirement. The subcarrier intervals are only an example herein. Each TTI is corresponding to a specific subcarrier interval. Even different TTIs may be corresponding to a same subcarrier interval, but each different TTI includes a different quantity of symbols. For example, a signature is allocated to each TTI, as shown in Table 1.

TABLE 1

Comparison table between signatures and TTIs

| TTI | Signature |
|---|---|
| TTI-1 | Signature 1 |
| TTI-2 | Signature 2 |

TABLE 1-continued

Comparison table between signatures and TTIs

| TTI | Signature |
| --- | --- |
| TTI-3 | Signature 3 |
| TTI-4 | Signature 4 |
| TTI-5 | Signature 5 |

Table 1 shows only an example. A specific TTI length and quantity are not limited in this embodiment of the present disclosure, and a similar method may be extended. A specific TTI length and signature code (that is, code obtained after each signature is coded) are not given in Table 1. For example, the signature code may be code division multiple access (CDMA for short) code, low density signature (LDS for short) code, sparse code multiple access (SCMA for short) code, or the like.

At a transmit end, when the user terminal sends a preamble, signature code and a selected preamble are multiplied or a selected preamble is multiplied or scrambled by using signature code (or scrambling code) to carry the signature information, so as to send the information about the data attribute requirement to a receive end (for example, the base station in FIG. 5). At the receive end, the base station performs, by using the signature code, an operation on a signal obtained after matched filtering, and then performs signal energy accumulation. A preamble may be obtained by means of a related operation or a preamble is obtained by means of descrambling.

After detecting the preamble, and obtaining the information about the data attribute requirement of the user terminal (for example, a method shown in FIG. 6), the base station sends, to the user terminal, the message 2 that carries sub-band information of the target sub-band. For example, the sub-band information may include one or more of the following: a sub-band number, a sub-band frequency channel number, a timing advance, an uplink resource allocated by the base station, a sub-band sending power level, or a bandwidth. Alternatively, the sub-band information may include one or more of the following: access resource information, TA adjustment information, or power transmit information.

After receiving the message 2, the user terminal performs scheduling to the target sub-band according to the obtained sub-band information. Specifically, the user terminal calculates a TA adjustment amount of the target sub-band according to the TA adjustment information or directly performs TA adjustment by using the TA adjustment information (a specific TA adjustment manner depends on a TA adjustment method defined in a system, and for details, refer to Embodiment 3), and transmits the message 3 and the message 4 on the target sub-band. A difference from a conventional random access process is that when the user terminal completes transmission of the message 3 on the target sub-band for the first time, the base station may indicate, in the message 4, that the user terminal performs TA adjustment again, so that transmission synchronization between the user terminal and the base station is more precise.

Figure 6:
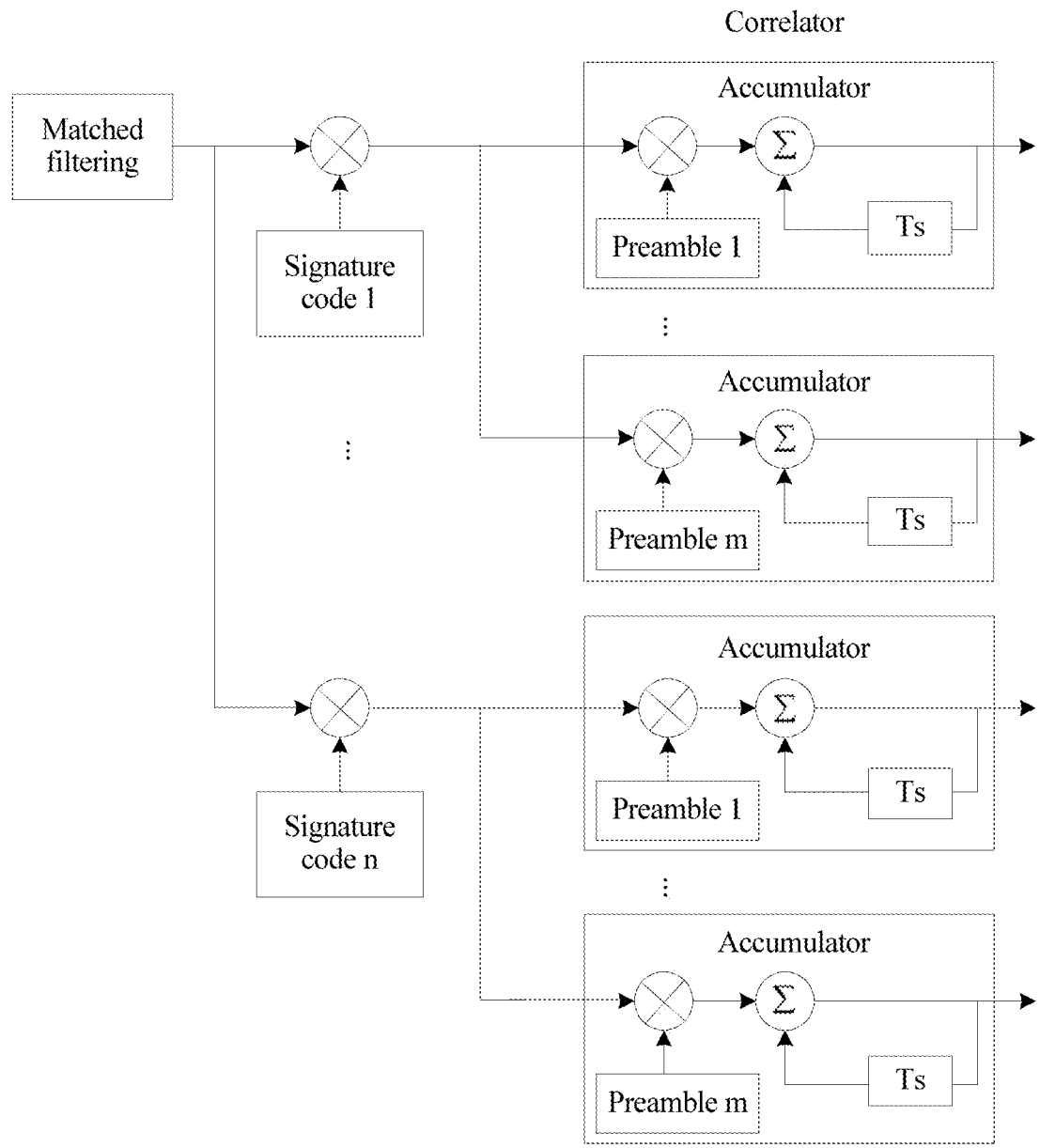
FIG. 6 shows a signature obtaining method according to Embodiment 2 of the present disclosure.

FIG. 6 shows a signature obtaining method according to Embodiment 2 of the present disclosure. As shown in FIG. 6, after matched filtering is performed on a received signal (for example, the message 1 in FIG. 5) at a receive end (for example, the base station in FIG. 5), an operation is performed on the signal and each signature. Each tributary signal obtained after the operation passes through an accumulator to accumulate signal energy. Then, energy detection is performed on each output tributary signal, and when energy exceeds a threshold, it is considered that a preamble is received. Signature code corresponding to a tributary whose energy exceeds a threshold is signature code used by a transmit end (for example, the user terminal in FIG. 5). In addition, in FIG. 6, n is a quantity of signature code, m is a quantity of preambles, Ts is a part of a correlator.

Embodiment 3

In conventional communications system, a base station performs scheduling for a user terminal. Because of a limit on a system processing capability, a resource allocated by the base station is a resource in a subframe after four subframes following a current subframe. That is, a location of (l+4) is a start location of a resource allocated to the user terminal, and l is a current subframe location.

In a system supporting a multi-TTI frame structure, when the user terminal performs scheduling from a current sub-band to a target sub-band for transmission, a subframe number of the target sub-band needs to be determined (that is, a start location of the resource allocated to the user terminal needs to be determined). Waveforms of sub-bands corresponding to different TTIs are different, and therefore start locations of subframes on different sub-bands may be different. When a subframe number of a resource scheduled on the target sub-band is determined, two factors need to be considered: One is a TA that needs to be adjusted by the user terminal because of a distance from the base station. The other is a time deviation of subframe start locations on two different sub-bands. The time deviation may be used to determine whether the start location of the resource allocated by the base station is at a start location of a next subframe on the target sub-band or a start location of a second next subframe on the target sub-band.

There may be two methods for determining the subframe number of the resource scheduled on the target sub-band: One is carrying the start location of the resource allocated on the target sub-band during scheduling of random access. The other is that the user terminal automatically calculates, according to a scheduling subframe location received on the current sub-band, a subframe number (or a subframe location) that is on the target sub-band and that is allocated by the base station to the user terminal. The first method is relatively simple, that is, during allocation of a UL grant resource for random access, a subframe number (or a subframe location) is specified. This method is relatively easy to be implemented, but brings signaling overheads.

There are two solutions for the second method. One solution is that a TA is considered, and the other solution is that a TA is not considered. When the TA is not considered, the method is relatively simple, but an advantage of considering the TA is that scheduling is more precise, and is more timely. If the TA is a negative value, timing is shifted forwards. This may cause the user terminal to miss scheduling for one time. Because current processing is not completed, sending cannot be performed at a preset sending moment. If the TA is a positive value, timing is shifted backwards. A transmission delay is caused. This may cause a case in which sending might have been performed at a preset moment, but is not performed. Embodiment 3 of the present disclosure provides a method for calculating the subframe number of the resource scheduled on the target sub-band when the TA is considered, and details are as follows:

It is assumed that a radio frame length $T_f$ is a constant, and it is assumed that the user terminal is changed to a $j^{th}$ sub-band from an $i^{th}$ sub-band, a subframe length of the $i^{th}$ sub-band is $T_i^S$, and a subframe length of the $j^{th}$ sub-band is $T_j^S$. It is assumed that frame synchronization has been performed on different sub-bands, TTIs corresponding to different sub-bands are in a multiple relationship or subframe lengths of different sub-bands are in a multiple relationship. It should be noted that if start boundaries of subframes are aligned, TTIs corresponding to different sub-bands may be not in a multiple relationship, or subframe lengths of different sub-bands may be not in a multiple relationship.

When $T_i^S > T_j^S$, a subframe start boundary of the $i^{th}$ sub-band is a subframe start boundary of the $j^{th}$ sub-band. Therefore, a subframe boundary deviation between the two sub-bands is 0. In this case, when a timing deviation is adjusted, only TA=δ (δ is a real number) needs to be considered. It is assumed that a processing delay of the base station is $T_p$, and a subframe number of a current sub-band is k. A subframe number corresponding to a start location of a resource scheduled on the target sub-band is $$(k+1) \times \frac{T_i^s}{T_j^s} + \lceil (T_p + \delta)/T_j^s \rceil.$$

⌈●⌉ indicates rounding down performed on ●.

When $T_i^S < T_j^S$, it is assumed that a subframe number of a current sub-band is k. A time difference between a subframe and a start moment of a radio frame in which the subframe is located is $(k+1) \times T_i^S$, and a subframe number of a target sub-band corresponding to the time difference is $\lfloor (k+1) \times T_i^S / T_j^S \rfloor$. Therefore, a time difference between a current moment and a start location of a next subframe of a subframe corresponding to the current moment on the target sub-band is $\Delta T = (\lfloor (k+1) \times T_i^S / T_j^S \rfloor + 1) \times T_j^S - (k+1) \times T_i^S$. Therefore, when TA=δ is considered, a total time difference is $\Delta T + \delta$. It is assumed that a processing delay is $T_p$. A difference between a start location of a resource allocated on the target sub-band and the current moment is at least $T_p$. If $\Delta T + \delta > T_p$, a subframe number corresponding to the start location of the resource is $\lfloor (k+1) \times T_i^S / T_j^S \rfloor + 1$. If $\Delta T + \delta < T_p$, a subframe number corresponding to the start location of the resource scheduled on the target sub-band is $\lfloor (k+1) \times T_i^S / T_j^S \rfloor + \lceil (T_p - \delta - \Delta T)/T_j^S \rceil$. ⌊●⌋ indicates rounding up performed on ●.

Figure 7:
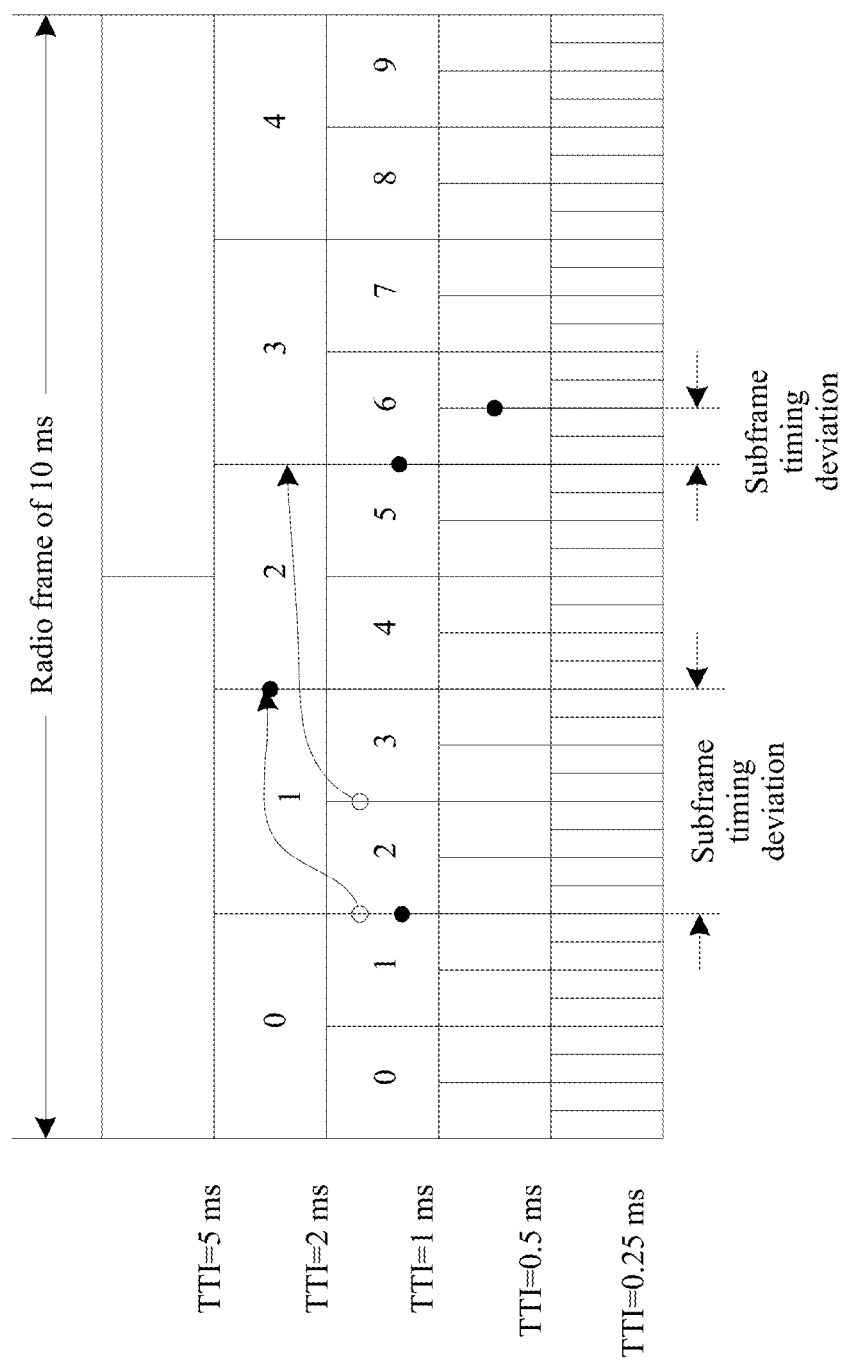
FIG. 7 shows an example of determining a subframe number according to Embodiment 3 of the present disclosure.

For example, FIG. 7 is an example of determining a subframe number according to Embodiment 3 of the present disclosure. As shown in FIG. 7, there are five sub-bands in total, TTIs corresponding to the five sub-bands are respectively 5 ms, 2 ms, 1 ms, 0.5 ms, and 0.25 ms. It should be noted that a subframe length of a sub-band with a 5-ms TTI and a subframe length of a sub-band with a 2-ms TTI are not in a multiple relationship. A subframe with a 1-ms TTI is used as an example, and scheduling from a sub-band with a 1-ms TTI to another sub-band is considered. If a frame structure design in a future communications system is compatible with communications systems of LTE and another earlier version, a sub-band with a moderate TTI, for example, a sub-band with a 1-ms TTI, may be selected as a common sub-band. It is assumed that a radio frame (or referred to as a super frame) is 10 ms. Subframes in a super frame in each sub-band are numbered in sequence, and a start subframe number is 0. As shown in FIG. 7, in a sub-band with a 0.25-ms TTI, one frame (super frame) includes 40 subframes, and for a sub-band with a 5-ms TTI, one frame includes two subframes, and so on.

For example, it is assumed that a processing delay of the base station is 2 ms. It can be seen from FIG. 7 that if scheduling signaling (for example, the message 4 in FIG. 3 or the message 2 in FIG. 5) is received at a second subframe (a subframe 1 with a 1-ms TTI) with a 1-ms TTI, scheduling (for example, sub-band synchronization in FIG. 3 or the message 3 in FIG. 5) on a target sub-band (with a 2-ms TTI) is in a subframe 2. If scheduling signaling is received at a third subframe (a subframe 2 with a 1-ms TTI) with a 1-ms TTI, scheduling on a target sub-band can be performed only in a subframe 3.

It should be understood that according to a subframe number determining method, a subframe number may be directly obtained by means of calculation according to a formula provided in this embodiment of the present disclosure, or a table may be obtained according to the method provided in this embodiment of the present disclosure, and a subframe number is determined in a table lookup manner. In addition, because a subframe length of each sub-band is fixed, determining a subframe number is equivalent to determining a start location of a subframe, and vice versa.

Embodiment 4

When a future user terminal supports multi-TTI transmission, the user terminal may perform transmission on multiple sub-bands at the same time. To save power, if the user terminal does not transmit data on a sub-band corresponding to a specific TTI, and a PUCCH is not configured on the sub-band, when the user terminal needs to perform uplink data transmission on the sub-band, a conventional method is that the user terminal performs uplink scheduling request (SR for short) transmission by initiating a random access process. However, when the user terminal configures a PUCCH or transmits data on another sub-band, the method of performing uplink scheduling request transmission by initiating a random access process wastes system resources and causes a data transmission delay.

For this problem, an effective method is providing an independent MAC for each TTI (or for each sub-band), so that scheduling and transmission in a system are more efficient. Therefore, when an SR needs to be sent on a sub-band corresponding to a specific TTI, if a PUCCH resource is not configured on the sub-band (or a physical channel) corresponding to the current TTI, the SR may be sent on a resource on a sub-band corresponding to another TTI.

Figure 8:
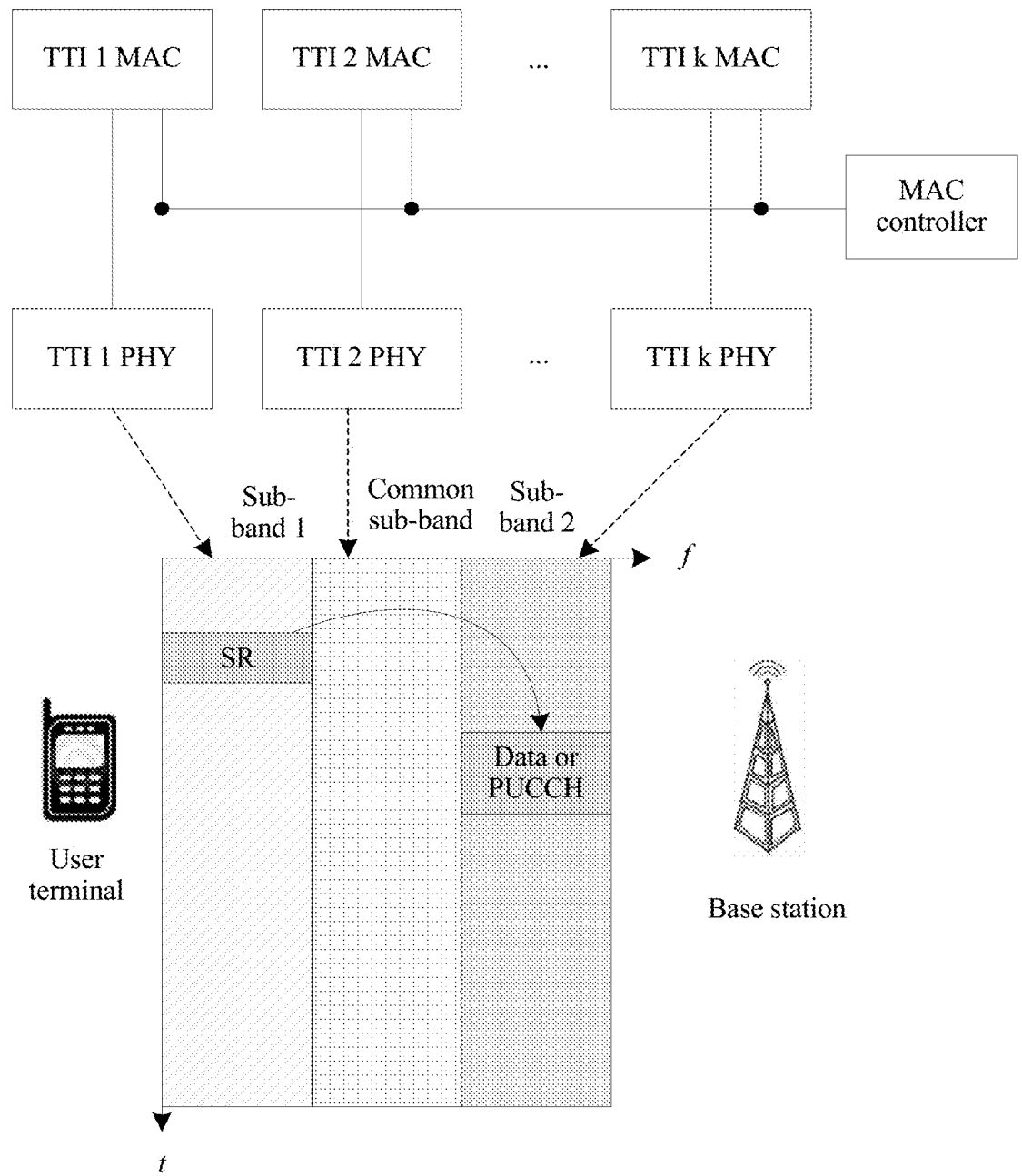
FIG. 8 shows a scheduling request sending method according to Embodiment 4 of the present disclosure.

FIG. 8 shows a scheduling request sending method according to Embodiment 4 of the present disclosure. As shown in FIG. 8, an upper portion in FIG. 8 indicates an example of an independent MAC (or an independent MAC entity) supporting multiple TTIs. A sub-band corresponding to each TTI has a MAC entity (a TTI1 MAC, a TTI2 MAC, . . . , and a TTIk MAC that are one-to-one corresponding to sub-bands). When data needs to be sent on a sub-band 1, and no PUCCH is configured and no data is sent on the sub-band 1 in this case, an SR may be sent by using a resource on a sub-band 2, and the SR may be sent together with data on the sub-band 2. If no data is sent on the sub-band 2, sending may be performed by using a PUCCH of the sub-band 2.

Figure 9:
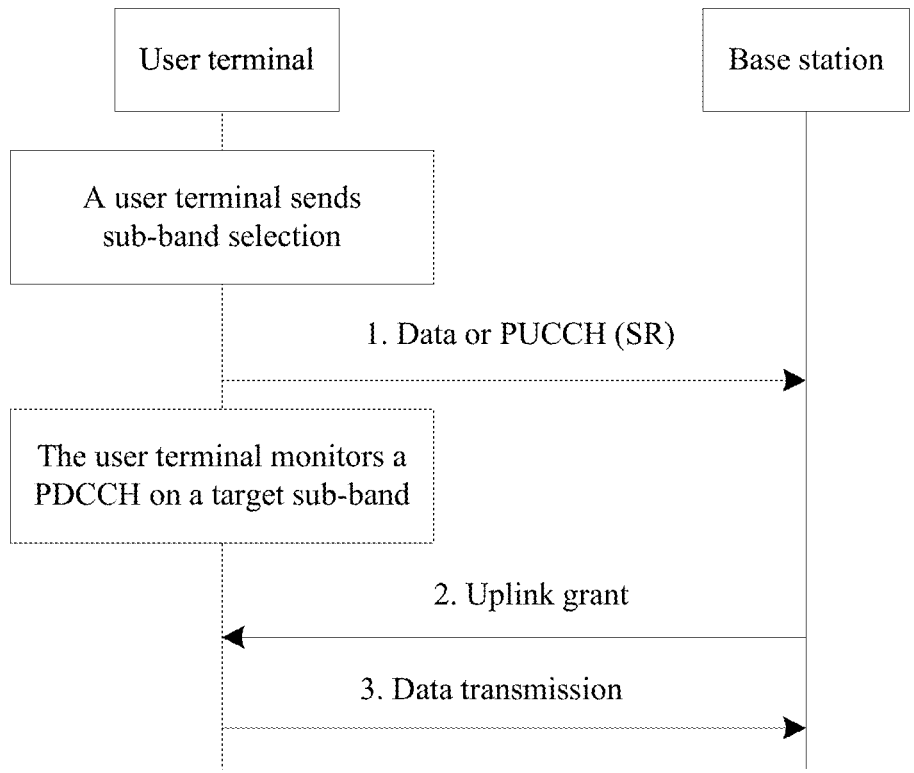
FIG. 9 shows an SR transmission method according to Embodiment 4 of the present disclosure.

FIG. 9 shows an SR transmission method according to Embodiment 4 of the present disclosure. As shown in FIG. 9, the user terminal determines a sub-band (that is, a target sub-band) used for sending an SR, and sends the SR and a buffer status report (BSR for short) to a MAC entity of the target sub-band. The target sub-band adds the SR to to-be-sent data, or sends the SR by using a PUCCH.

The SR includes at least sub-band information of a source sub-band (the sub-band 1 in FIG. 8). If the SR is sent by using the PUCCH, the target sub-band instructs a physical layer to send the SR, and the SR includes the sub-band information of the source sub-band. If data is sent on the target sub-band, a base station is instructed, by adding a BSR (a MAC layer command) to the data, to allocate a resource to the source sub-band, and the BSR may further carry the sub-band information of the source sub-band.

After the SR or the BSR is sent to the target sub-band (or the MAC entity of the target sub-band), a PDCCH on the target sub-band is monitored on the source sub-band (or a MAC entity of the source sub-band). After receiving the request, the base station allocates a resource to the source sub-band. The base station sends the allocated resource to the source sub-band. Specifically, there may be two sending methods. A first method is directly sending an allocated UL grant resource on a PDCCH of the source sub-band. Because the source sub-band monitors the PDCCH, this method is implemented relatively directly. A second method is performing sending by using the target sub-band, and performing sending to the sending sub-band by using the target sub-band. If sending is performed by using the target sub-band, after the SR or the BSR is sent, the user terminal does not need to monitor the PDCCH (in FIG. 9, the user terminal does not need to monitor the PDCCH on the target sub-band). A disadvantage of the second method is that the allocated UL grant resource needs to be sent on the target sub-band to the source sub-band, and this causes a delay.

After the allocated resource is received on the source sub-band, data is sent on the resource. Further, to improve PUCCH resource utilization, a PUCCH may be configured on only one sub-band in a system supporting multiple TTIs, and a PUCCH does not need to be configured on each sub-band.

Figure 10:
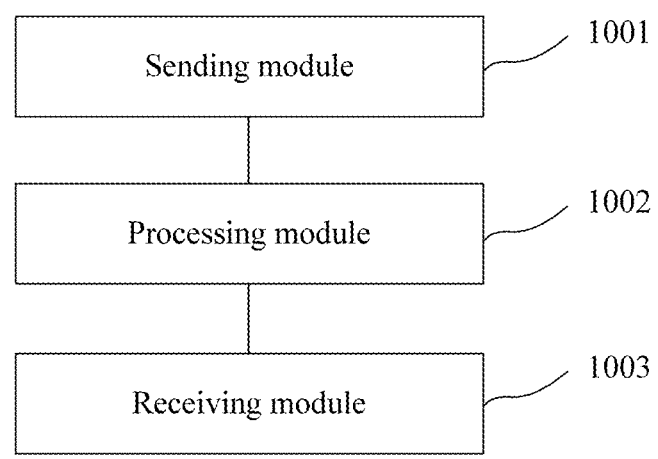
FIG. 10 shows a sub-band scheduling apparatus according to an embodiment of the present disclosure.

Corresponding to the foregoing method embodiments, an embodiment of the present disclosure further provides a sub-band scheduling apparatus. Referring to FIG. 10, the apparatus is used in a random access process and includes:

a sending module 1001, configured to send, to a base station on a source sub-band, a first message that carries information about a data attribute requirement of to-be-transmitted data, where the information about the data attribute requirement includes at least one of the following: a transmission delay, a transmission delay type, a data bandwidth requirement, or a packet loss sensitivity;

a receiving module 1003, configured to receive, from the base station on the source sub-band, a second message that carries sub-band information of a target sub-band, where the target sub-band is a sub-band that is scheduled by the base station and that meets the data attribute requirement of the to-be-transmitted data, and the sub-band information includes at least one of the following: a sub-band number, a sub-band frequency channel number, a timing advance, an uplink resource allocated by the base station, a sub-band sending power level, or a bandwidth; and a processing module 1002, configured to transmit data on the target sub-band according to the sub-band information of the target sub-band.

Steps performed when the sending module 1001, the receiving module 1003, and the processing module 1002 implement corresponding functions have been described in detail in the method embodiments, and details are not described herein again.

Optionally, the source sub-band and the target sub-band are corresponding to different TTIs.

Specifically, that the data is transmitted on the target sub-band according to the sub-band information of the target sub-band may include: after receiving the sub-band information of the target sub-band that is sent by the base station, a user terminal may preform scheduling from the source sub-band to the target sub-band according to the sub-band information of the target sub-band, adjust time synchronization according to the timing advance in the sub-band information, and transmit data on the uplink resource indicated by the sub-band information.

Further, the apparatus further includes: a synchronization module, configured to perform sub-band synchronization on the target sub-band.

Some technical features involved, for example, sub-band synchronization, signature information, and subframe number determining, are similar to or corresponding to some technical features involved in the method embodiments of the present disclosure, and are not described again in this embodiment.

Figure 11:
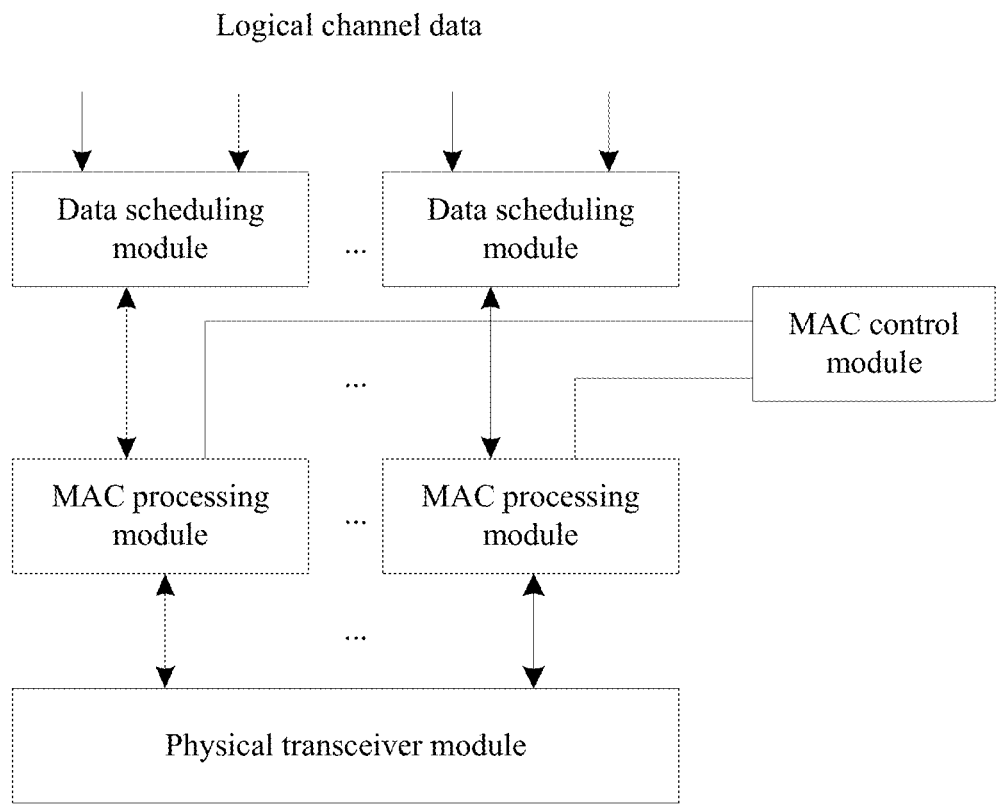
FIG. 11 shows a sub-band scheduling apparatus according to an embodiment of the present disclosure.

Corresponding to the foregoing method embodiments, an embodiment of the present disclosure further provides a sub-band scheduling apparatus. Referring to FIG. 11, the apparatus is used in a random access process and includes: a physical transceiver module, multiple MAC processing modules, a MAC control module, and multiple data scheduling modules.

A data scheduling module is configured to schedule, according to information about a data attribute requirement of to-be-transmitted data, data that has same information about a data attribute requirement in a same MAC processing module. Optionally, information about a data attribute requirement is corresponding to a TTI (or a TTI requirement). Therefore, data that has a same TTI requirement may be scheduled in a same MAC processing module.

A MAC processing module is configured to perform MAC layer processing. The MAC layer processing includes parsing and encapsulating a random access message (for example, a message 1, a message 2, a message 3, or a message 4), receiving data of the data scheduling module, and the like. Specifically, the MAC layer processing is performed on data transmitted from the data scheduling module. Optionally, different MAC processing modules are corresponding to different TTIs, that is, different MAC processing modules process data corresponding to different TTIs.

The MAC control module is configured to implement message transmission between the multiple MAC processing modules. Specifically, during scheduling from a sub-band to another sub-band, a source MAC processing module needs to notify a target MAC processing module. The source MAC processing module sends, by using the MAC control module, timing adjustment information (that is, subframe delimitation information, and in this case, sub-band information needs to include the timing adjustment information) to the target MAC processing module according to sub-band information (the sub-band information meets the data attribute requirement of the to-be-transmitted data) received from a base station. In this case, the to-be-transmitted data may be transmitted by using the target MAC processing module.

The physical transceiver module is configured to send data transmitted from the multiple MAC processing modules, and/or send received data that is obtained by means of physical layer processing to the multiple MAC processing modules.

Some technical features involved, for example, sub-band synchronization, signature information, and subframe number determining, are similar to or corresponding to some technical features involved in the method embodiments of the present disclosure, and are not described again in this embodiment.

Figure 12:
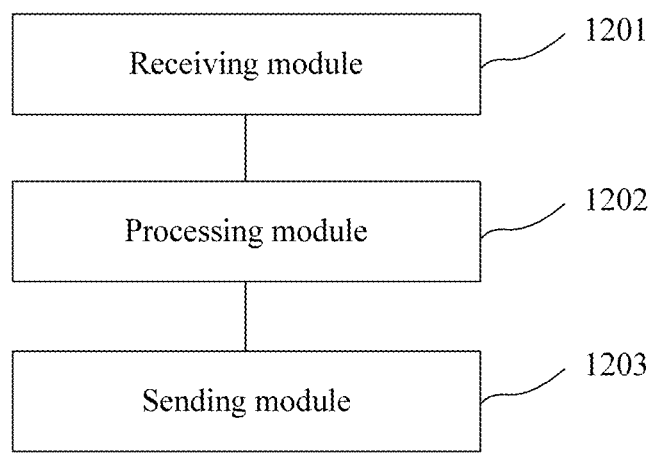
FIG. 12 shows a sub-band scheduling apparatus according to an embodiment of the present disclosure.

Corresponding to the foregoing method embodiments, an embodiment of the present disclosure further provides a sub-band scheduling apparatus. Referring to FIG. 12, the apparatus is used in a random access process and includes:

a receiving module 1201, configured to receive, from a user terminal on a source sub-band, a first message that carries information about a data attribute requirement of to-be-transmitted data, where the information about the data attribute requirement includes at least one of the following: a transmission delay, a transmission delay type, a data bandwidth requirement, or a packet loss sensitivity;

a sending module 1203, configured to send, to the user terminal on the source sub-band, a second message that carries sub-band information of a target sub-band, where the target sub-band is a sub-band that is scheduled for the user terminal and that meets the data attribute requirement of the to-be-transmitted data, and the sub-band information includes at least one of the following: a sub-band number, a sub-band frequency channel number, a timing advance, an uplink resource allocated to the user terminal, a sub-band sending power level, or a bandwidth; and a processing module 1202, configured to transmit data on the target sub-band according to the sub-band information of the target sub-band.

Steps performed when the receiving module 1201, the sending module 1203, and the processing module 1202 implement corresponding functions have been described in detail in the method embodiments, and details are not described herein again.

Optionally, the source sub-band and the target sub-band are corresponding to different TTIs.

Specifically, that the processing module 1202 transmits data on the target sub-band according to the sub-band information of the target sub-band may include: after receiving the sub-band information of the target sub-band that is sent by the base station, the user terminal may preform scheduling from the source sub-band to the target sub-band according to the sub-band information of the target sub-band, adjust time synchronization according to the timing advance in the sub-band information, and transmit data on the uplink resource indicated by the sub-band information.

Some technical features involved, for example, sub-band synchronization, signature information, and subframe number determining, are similar to or corresponding to some technical features involved in the method embodiments of the present disclosure, and are not described again in this embodiment.

The sub-band scheduling apparatus provided in this embodiment of the present disclosure may be used in a user terminal, a network element node device, or a base station.

Figure 13:
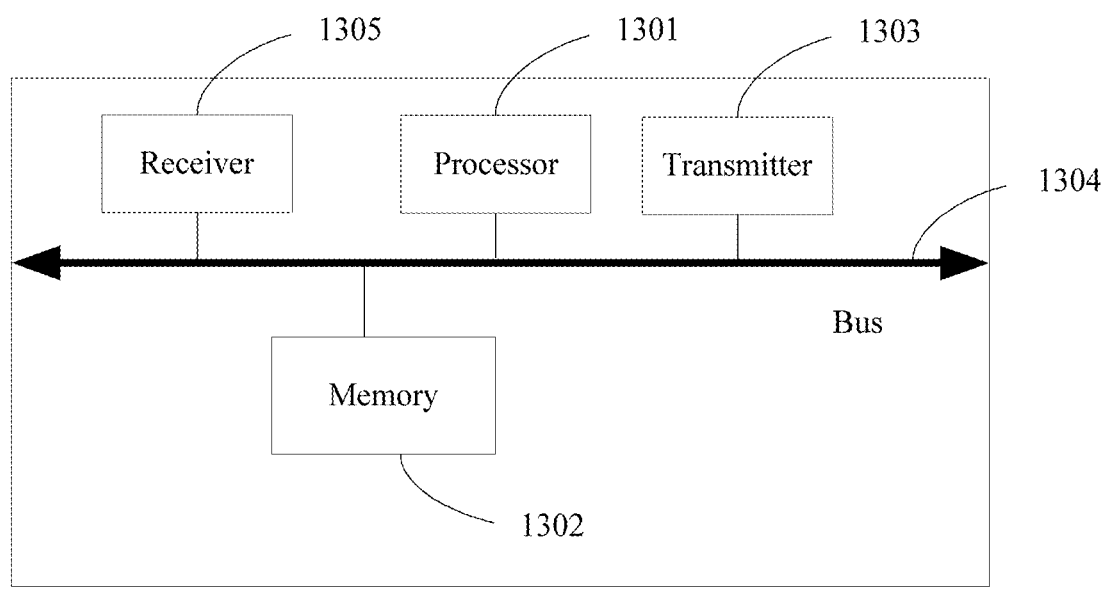
FIG. 13 shows a sub-band scheduling device according to an embodiment of the present disclosure.

An embodiment of the present disclosure further provides a processing device. Referring to FIG. 13, the device includes: a processor 1301, a memory 1302, a transmitter 1303, a receiver 1305, and a bus 1304. The processor 1301, the memory 1302, the transmitter 1303, and the receiver 1305 are connected by using the bus 1304 for data transmission, and the memory 1302 is configured to store data processed by the processor 1301.

The bus 1304 may be an industry standard architecture (ISA for short) bus, a peripheral component interconnect (PCI for short) bus, an extended industry standard architecture (EISA for short) bus, or the like. This is not limited herein. The bus 1304 may be classified into an address bus, a data bus, a control bus, and the like. For ease of representation, only one bold line is used in FIG. 13 for representation, but it does not indicate that there is only one bus or one type of bus.

The memory 1302 is configured to store data or executable program code, and the program code includes a computer operation instruction and may be specifically an operating system, an application program, or the like. The memory 1302 may include a high-speed RAM memory, and may further include a non-volatile memory, for example, at least one magnetic disk memory.

The processor 1301 may be a central processing unit (CPU for short), or an application-specific integrated circuit (ASIC for short), or one or more integrated circuits configured to implement this embodiment of the present disclosure.

The transmitter 1303 and the receiver 1305 are configured to receive and send a message. The processor 1301 is configured to implement the sub-band scheduling method in the foregoing embodiments by executing the program code in the memory 1302. Some technical features involved, for example, sub-band synchronization, signature information, and subframe number determining, are similar to or corresponding to some technical features involved in the method embodiments of the present disclosure, and are not described again in this embodiment. A specific process is not described again.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit. Specifically, the integrated unit may be implemented by using software in addition to necessary general-purpose hardware. The general-purpose hardware includes a general-purpose integrated circuit, a general-purpose CPU (Central Processing Unit), a general-purpose digital signal processor (DSP for short), a field programming gate array (FPGA for short), a programmable logical device (PLD for short), a general-purpose memory, a general-purpose component, or the like. Certainly, alternatively, the integrated unit may be implemented by using an application specific integrated circuit (ASIC for short), a special-purpose CPU, a special-purpose memory, a special-purpose component, or the like.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM for short), a random access memory (RAM for short), a magnetic disk, or an optical disc.

Alternatively, software or an instruction may be transmitted by using a transmission medium. For example, if software is transmitted from a website, a server or another remote source by using a coaxial cable, an optical fiber/cable, a twisted pair, a digital subscriber line (DSL for short) or wireless technologies (such as infrared ray, radio and microwave), the coaxial cable, optical fiber/cable, twisted pair, DSL or wireless technologies (such as infrared ray, radio and microwave) are included in definitions of a transmission medium.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A communication method comprising:
sending, to a base station on a source sub-band, a first message that carries data attribute requirement information for to-be-transmitted data, wherein the data attribute requirement information comprises at least one of a transmission delay, a transmission delay type, a data bandwidth requirement, or a packet loss sensitivity parameter;
receiving, from the base station on the source sub-band, a second message that carries sub-band information for a target sub-band, wherein the sub-band information comprises at least an uplink resource parameter allocated by the base station, and the target sub-band comprises a sub-band scheduled by the base station according to the data attribute requirement information; and
transmitting data on the target sub-band according to the sub-band information for the target sub-band,
wherein the uplink resource parameter comprises a time-frequency resource parameter allocated on the target sub-band, the time-frequency resource parameter comprising a time domain subframe number and a frequency domain resource block, wherein the time domain subframe number is determined based at least in part on a time difference between a current moment and a start moment of a subframe on the target sub-band that is closest to the current moment, a timing advance, and a scheduling processing time of the target sub-band.

2. The method according to claim 1, wherein the first message is a non-transport layer message; and
the second message is a contention resolution message.

3. The method according to claim 2, wherein after the receiving a second message, the method further comprises:
performing sub-band synchronization on the target sub-band.

4. The method according to claim 1, wherein the first message includes a random access preamble; and
the second message is a random access response message.

5. The method according to claim 4, further comprising:
performing sub-band synchronization on the target sub-band.

6. The method according to claim 4, wherein the random access preamble in the first message includes signature information having different signatures, wherein each signature corresponding to different data attributes.

7. The method according to claim 1, the time domain subframe number is determined according to a subframe number of a subframe related to the second message, or is indicated by the base station by using a random access message.

8. The method according to claim 7, wherein
when $\Delta T + \delta > T_p$, a subframe number of the subframe allocated on the target sub-band and that is closest to the current moment is the time domain subframe number; or
when $\Delta T + \delta \leq T_p$, a subframe number of a next subframe of the subframe allocated on the target sub-band and that is closest to the current moment is the time domain subframe number, wherein
$\Delta T$ is a time difference between the current moment and the start moment of the subframe that is on the target sub-band and that is closest to the current moment, $\delta$ is the timing advance , and $T_p$ is the scheduling processing time of the target sub-band.

9. The method according to claim 1, wherein the source sub-band and the target sub-band correspond to different transmission time intervals (TTIs).

10. An apparatus comprising:
   a transmitter, configured to send, to a base station on a source sub-band, a first message including data attribute requirement information for to-be-transmitted data, wherein data attribute requirement information comprises at least one of a transmission delay, a transmission delay type, a data bandwidth requirement, or a packet loss sensitivity parameter;
   a receiver, configured to receive, from the base station on the source sub-band, a second message including sub-band information for a target sub-band, wherein the sub-band information comprises at least an uplink resource parameter allocated by the base station, and the target sub-band comprises a sub-band that is scheduled by the base station and that meets the data attribute requirement of the to-be-transmitted data; and
   a processor, configured to transmit data on the target sub-band according to the sub-band information for the target sub-band,
   wherein the uplink resource parameter comprises a time-frequency resource parameter allocated on the target sub-band, the time-frequency resource parameter comprising a time domain subframe number and a frequency domain resource block, wherein the time domain subframe number is determined based at least in part on a time difference between a current moment and a start moment of a subframe on the target sub-band that is closest to the current moment, a timing advance, and a scheduling processing time of the target sub-band.

11. The apparatus according to claim 10, wherein the first message is a non-transport layer message; and
   the second message is a contention resolution message.

12. The apparatus according to claim 11, wherein the processor is further configured to perform sub-band synchronization on the target sub-band.

13. The apparatus according to claim 10, wherein the first message includes a random access preamble; and
   the second message is a random access response message.

14. The apparatus according to claim 13, wherein the processor is further configured to perform sub-band synchronization on the target sub-band.

15. The apparatus according to claim 13, wherein the random access preamble in the first message includes signature information having different signatures, wherein each signature corresponding to different data attributes.

16. The apparatus according to claim 10, wherein the time domain subframe number is determined according to a subframe number of a subframe related to the second message, or is indicated by the base station by using a random access message.

17. The apparatus according to claim 16, wherein when $\Delta T + \delta > T_P$, a subframe number of the subframe allocated on the target sub-band and that is closest to the current moment is the time domain subframe number; or
   when $\Delta T + \delta \leq T_P$, a subframe number of a next subframe of the subframe allocated on the target sub-band and that is closest to the current moment is the time domain subframe number, where
   $\Delta T$ is the time difference between the current moment and the start moment of the subframe that is on the target sub-band and that is closest to the current moment, $\delta$ is the timing advance, and $T_p$ is the scheduling processing time of the target sub-band.

18. The apparatus according to claim 10, wherein the source sub-band and the target sub-band correspond to different transmission time intervals (TTIs).

* * * * *